(12) United States Patent
Tan et al.

(10) Patent No.: US 9,318,837 B2
(45) Date of Patent: Apr. 19, 2016

(54) ELECTRICAL CONNECTOR

(71) Applicant: Molex, LLC, Lisle, IL (US)

(72) Inventors: Han Guan Tan, Singapore (SG); Kian Heng Lim, Singapore (SG)

(73) Assignee: Molex, LLC, Lisle, IL (US)

( * ) Notice: Subject to any disclaimer, the term of this patent is extended or adjusted under 35 U.S.C. 154(b) by 88 days.

(21) Appl. No.: 14/090,908

(22) Filed: Nov. 26, 2013

(65) Prior Publication Data

US 2014/0148036 A1   May 29, 2014

(30) Foreign Application Priority Data

Nov. 29, 2012  (CN) .......................... 2012 1 0499941

(51) Int. Cl.
| | |
|---|---|
| H01R 13/62 | (2006.01) |
| H01R 13/506 | (2006.01) |
| H01R 12/71 | (2011.01) |
| H01R 13/447 | (2006.01) |
| G06K 13/08 | (2006.01) |

(52) U.S. Cl.
CPC ............ *H01R 13/506* (2013.01); *G06K 13/085* (2013.01); *H01R 12/712* (2013.01); *H01R 13/447* (2013.01)

(58) Field of Classification Search
CPC ............................. H01R 23/682; H01R 13/193
USPC .................. 439/326, 325, 328, 341, 342, 345
See application file for complete search history.

(56) References Cited

U.S. PATENT DOCUMENTS

2006/0270263 A1* 11/2006 Hirata ........................... 439/326

FOREIGN PATENT DOCUMENTS

| CN | 2520014 Y | 11/2002 |
|---|---|---|
| TW | M441239 U | 11/2012 |
| TW | M441240 U | 11/2012 |

* cited by examiner

*Primary Examiner* — Phuongcihi Nguyen
(74) *Attorney, Agent, or Firm* — Stephen L. Sheldon

(57) ABSTRACT

An electrical connector comprises a cover, terminal block, and pair of latch mechanisms. The cover comprises a top plate and two side edges connected to the top plate. The terminal block and the cover together define a slot. The terminal block comprises two opposite side edges. The pair of latch mechanisms is respectively provided between the two side edges of the cover and the two side edges of the terminal block. Each latch mechanism can include a first latch portion and a second latch portion. The first latch portion and the second latch portion are latched to each other and in a clearance fit, so as to allow the terminal block to rotate and move relative to the cover at the latch mechanism.

16 Claims, 16 Drawing Sheets

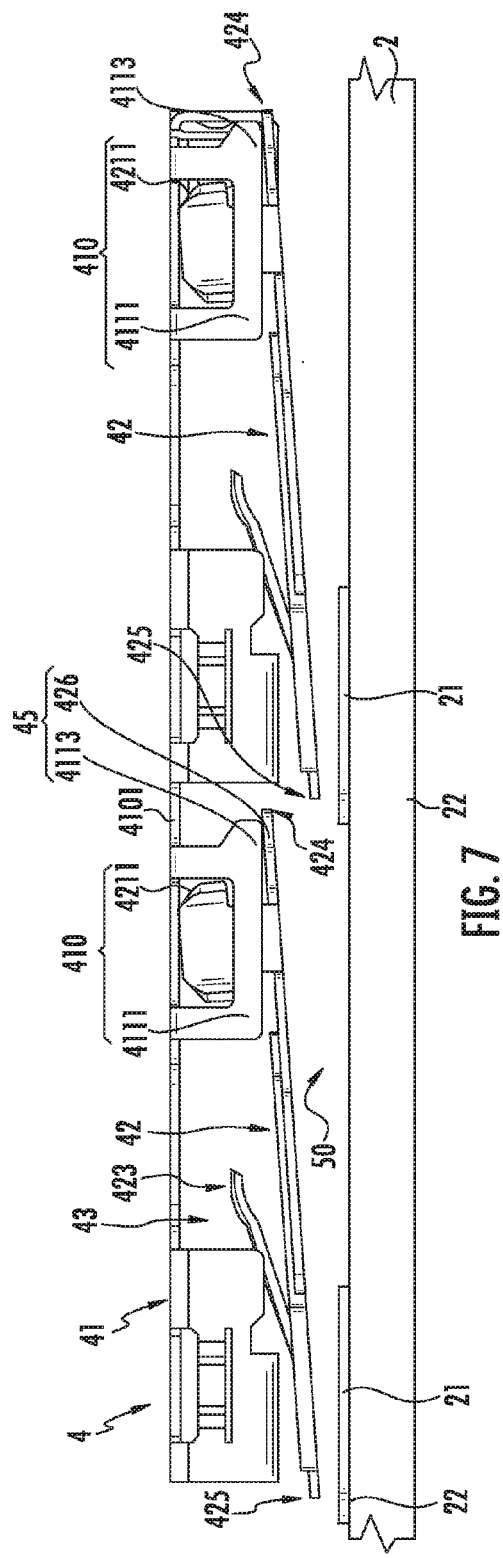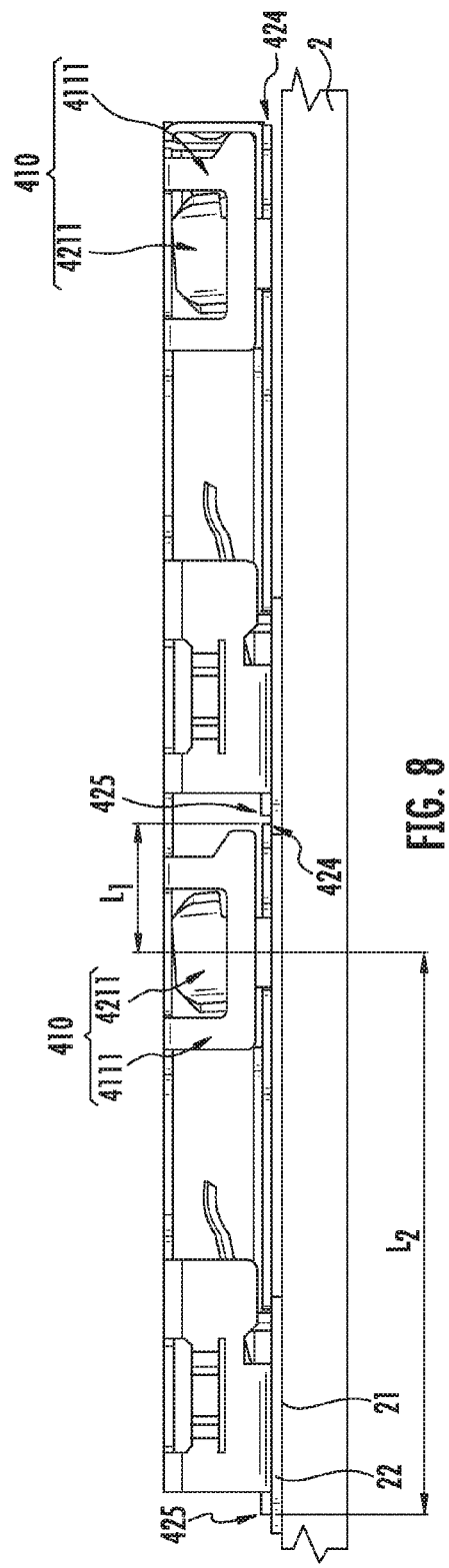

US 9,318,837 B2

ELECTRICAL CONNECTOR

RELATED APPLICATIONS

This application claims priority to Chinese Application No. 201210499941.5, filed Nov. 29, 2012, which is incorporated herein by reference in its entirety.

TECHNICAL FIELD

The present disclosure relates to an electrical connector.

BACKGROUND ART

User identification information of a mobile communication product is stored in a SIM (subscriber identity module) card, the SIM card is connected to the mobile communication product with a SIM electrical connector. FIG. 1 illustrates a SIM card connector 1 in the prior art. Typically, the SIM card connector 1 comprises a terminal block 10 and a metal shell 13. The metal shell 13 and the terminal block 10 are assembled together to form a space receiving the SIM card. The terminal block 10 comprises an insulative housing 11 and a plurality of terminals 12. The insulative housing 11 is generally made from plastic, the plurality of terminals 12 is fixed on the insulative housing 11 in an insert molding manner.

The metal shell 13 has a plurality of soldering points 131, and the each terminal 12 has a soldering portion 121. When the SIM card connector 1 is mounted on a circuit board, the soldering point 131 and the soldering portion 121 are soldered on a corresponding soldering pad of the circuit board.

As shown in FIG. 1, the terminal block 10 adopts a unitary design, the terminals 12 are arranged in front-rear two rows, and therefore, the terminal block 10 has considerable length and width. Long and wide terminal block 10 is susceptible to warping, so that it is difficult to ensure that the soldering points 131 of the metal shell 13 and the soldering portions 121 of the terminals 12 in the front-rear two rows of the SIM card connector 1 are coplanar after the SIM card connector 1 is assembled. Furthermore, as the insulative housing 11 is made from plastic, the terminal block 10 would warp generally after reflow is performed, which would worsen the situation that the soldering points 131 of the metal shell 13 and the soldering portions 121 of the terminals 12 in the front-rear two rows are not coplanar.

In addition, a plurality of projection portions 132, 133 are formed at side edges of the insulative housing 11, the plurality of projection portions 132, 133 may be fixedly engaged to side plates of the metal shell 13, so as to fix the metal shell 13 on the insulative housing 11. However, in such a fixed mode, the insulative housing 11 and the metal shell 13 can not move relatively, so as to allow a part of the soldering points 131 or the soldering portions 121 to suspend above the corresponding soldering pad(s) of the circuit board because of non-coplanarity of the soldering points 131 and the soldering portions 121, thereby resulting in the problem of poor soldering.

SUMMARY OF THE INVENTION

An electrical connector is disclosed that includes a cover, a terminal block, and a pair of latch mechanisms. The cover comprises a top plate and two side edges connected to the top plate. The terminal block and the cover together define a slot. The terminal block comprises two opposite side edges. Each latch mechanism of the pair of latch mechanisms is respectively provided between the two side edges of the cover and the two side edges of the terminal block. Each latch mechanism comprises a first latch portion and a second latch portion. The first latch portion and the second latch portion are latched to each other and in a clearance fit, so as to allow the terminal block to rotate and move relative to the cover at the latch mechanism.

The terminal block and the cover of the above embodiment can be latched to each other in a clearance fit manner, so as to allow soldering portions of the terminals of the terminal block and soldering pieces of the cover to adjust relative to each other in multiple directions, thereby ensuring that both the soldering portions of the terminals and the soldering pieces of the cover are reliably and suitably soldered on the circuit board. In addition, the clearance fit design can allow the same terminal block to latch on the different covers having different heights, allowing the terminal block to be used in a variety of applications.

BRIEF DESCRIPTION OF THE DRAWINGS

FIG. 7 is a side view of a cross-section of an embodiment of the present disclosure, which illustrates a state of the terminal block before the electrical connector is mounted on the circuit board;

FIG. 8 is a side view of a cross-section of an embodiment of the present disclosure, which illustrates a state of the electrical connector mounted on the circuit board;

DETAILED DESCRIPTION OF THE PREFERRED EMBODIMENTS

Hereinafter embodiments of the present disclosure will be described in details in combination with the Figures.

Figure 1:
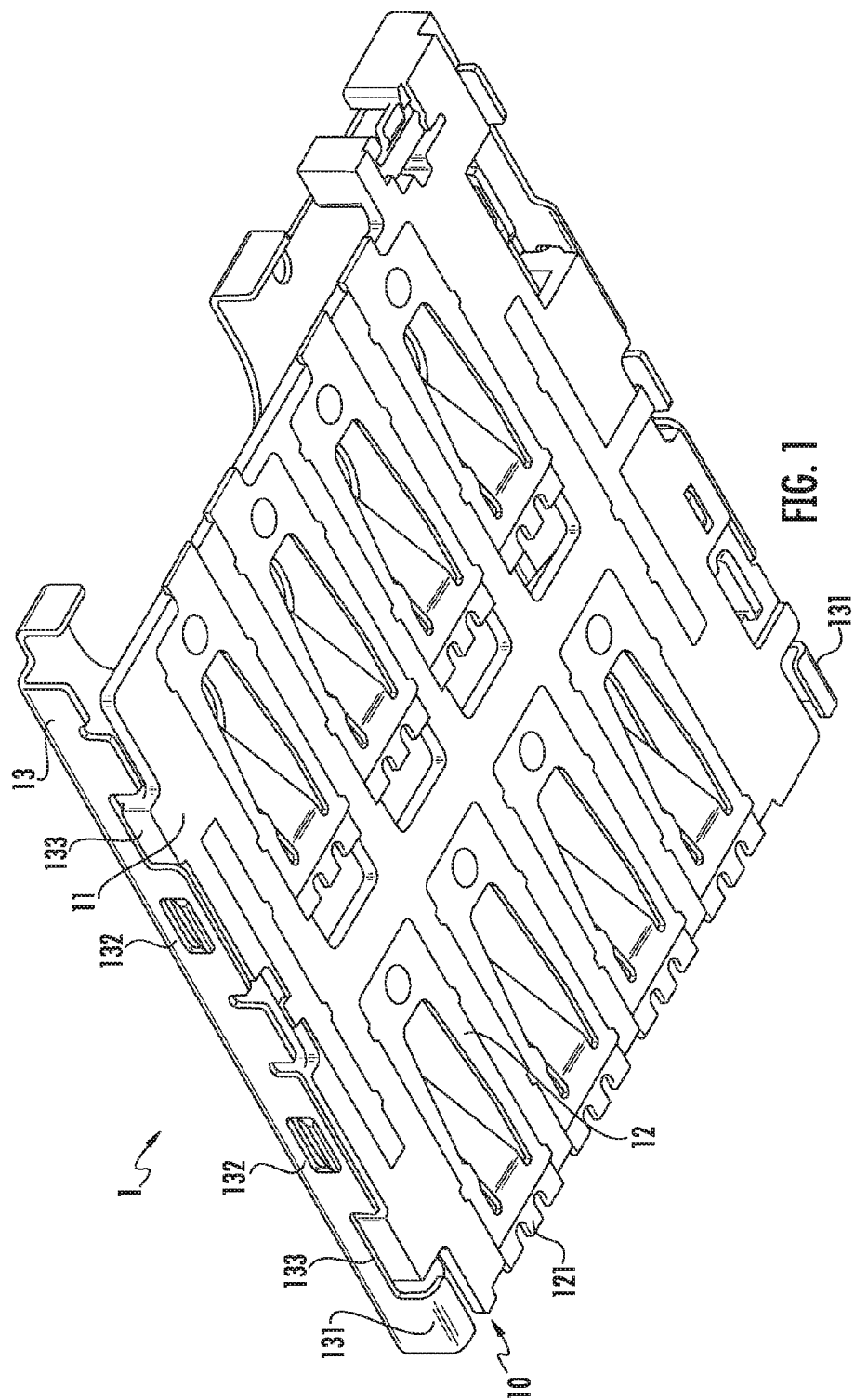
FIG. 1 shows a SIM card connector in the prior art.
Figure 2:
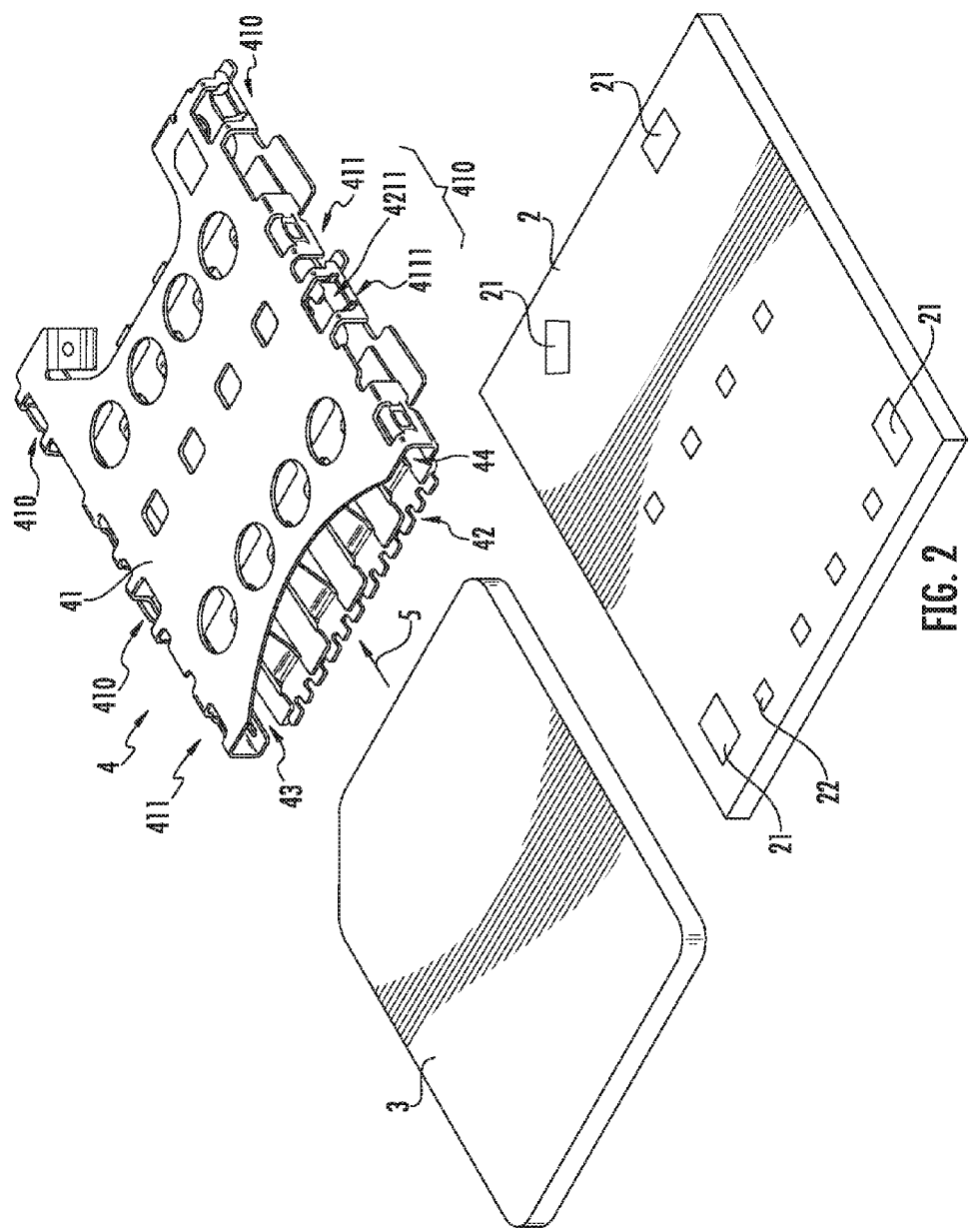
FIG. 2 is a perspective partially exploded view of an embodiment of a circuit board, an electronic card and an electrical connector.
Figure 3:
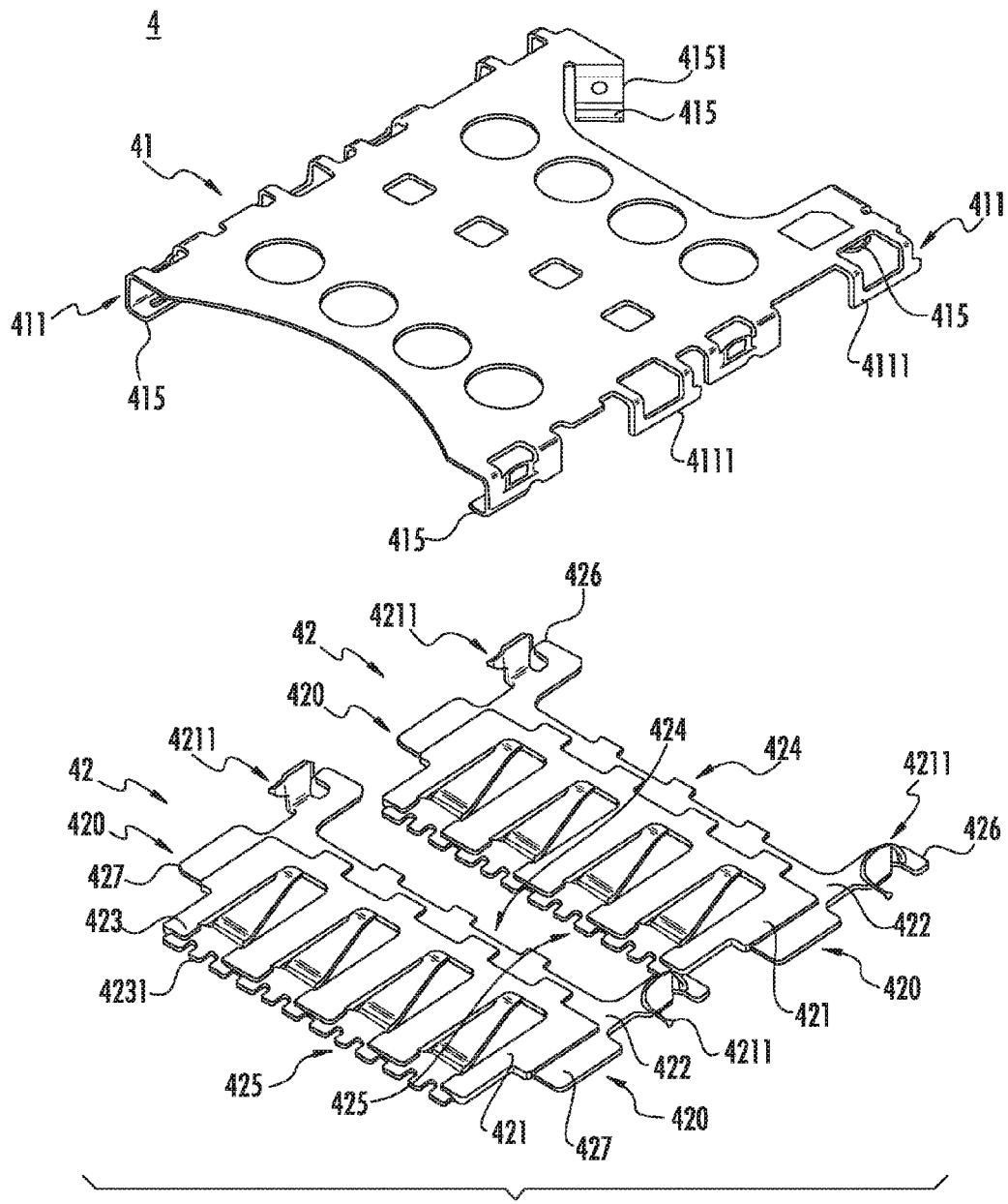
FIG. 3 is a perspective exploded view of an embodiment of an electrical connector.
Figure 4:
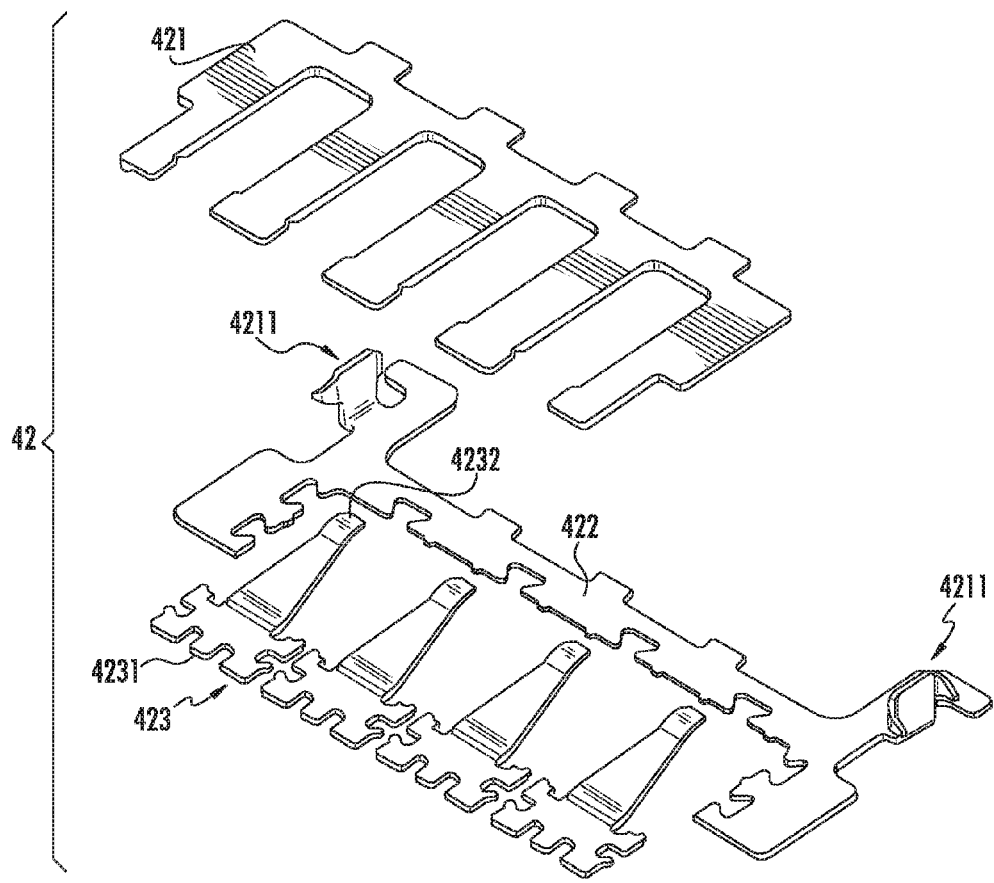
FIG. 4 is a perspective exploded view of an embodiment of an insulative body, a metal frame and terminals of a terminal block.

FIG. 2 is a perspective exploded view of an embodiment of the present disclosure, which illustrates a circuit board 2, an electronic card 3 and an electrical connector 4. FIG. 3 is an exploded perspective view of the electrical connector 4 of the embodiment of the present disclosure. FIG. 4 is a perspective exploded view of an insulative body 421, a metal frame 422 and terminals 423 of a terminal block 42 of the embodiment of the present disclosure. As shown in FIG. 2, an electrical connector 4 may mate to an electronic card 3. The electrical connector 4 may be soldered on the circuit board 2.

Referring to FIG. 2 and FIG. 3, the electrical connector 4 comprises a cover 41, a terminal block 42, and a pair of latch mechanisms 410 provided between two side edges 411 of the cover 41 and two side edges 420 of a terminal block 42. The terminal block 42 and the cover 41 are loosely latched via the pair of latch mechanisms 410, and together define a slot 43, the electronic card 3 may be inserted into the slot 43 in a mating direction 5 from front to rear from a mating interface 44 of the electrical connector 4.

Referring to FIG. 2 and FIG. 3, the cover 41 may comprise a plurality of soldering pieces 415, the soldering pieces 415 may be soldered to corresponding soldering pads 21 on the circuit board 2, the soldering piece 415 positioned in rear side is provided in an oblique direction relative to the mating direction 5 and has a block portion 4151 in the oblique direction to correspondingly stop a cutout in rear side of the electronic card 3. The terminal block 42 comprises a plurality of terminals 423 arranged in a row in a transverse direction perpendicular to the mating direction 5, the each terminal 423 comprises a soldering portion 4231, and the soldering portion 4231 may be soldered on the corresponding soldering pad 22. In an embodiment, the electrical connector 4 comprises a plurality of terminal blocks 42 and a plurality of pairs of latch mechanisms 410 (two terminal blocks 42 are illustrated in the embodiment shown in the Figures), the plurality of terminal blocks 42 may be arranged along the mating direction 5 of the electronic card 3, and are loosely latched to the cover 41 via the corresponding pairs of latch mechanisms 410. The use of the plurality of terminal blocks 42 can allow small dimension of the terminal block 42 in the mating direction 5 and separation of different rows of terminals 423 in different insulative bodies 421, to greatly reduce warping of the terminal block 42 generated in the mating direction 5, and improve the coplanarity between the soldering pieces 415 of the cover 41 and the soldering portions 4231 of the terminals 423 of the terminal blocks 42. In addition, a mold required to manufacture the shorter terminal block 42 is small, so as to reduce the manufacturing cost. In an embodiment, the plurality of terminal blocks 42 may be identical, so that the same mold can be used for manufacturing, so as to further reduce the manufacturing cost.

Figure 5:
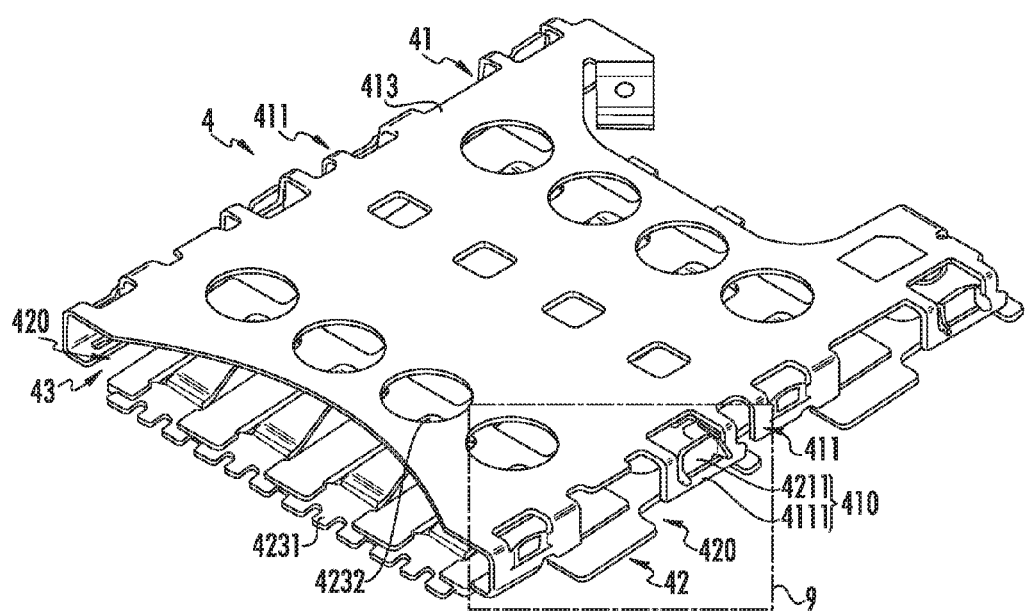
FIG. 5 is a perspective exploded view of an electrical connector of the embodiment of the present disclosure.
Figure 6:
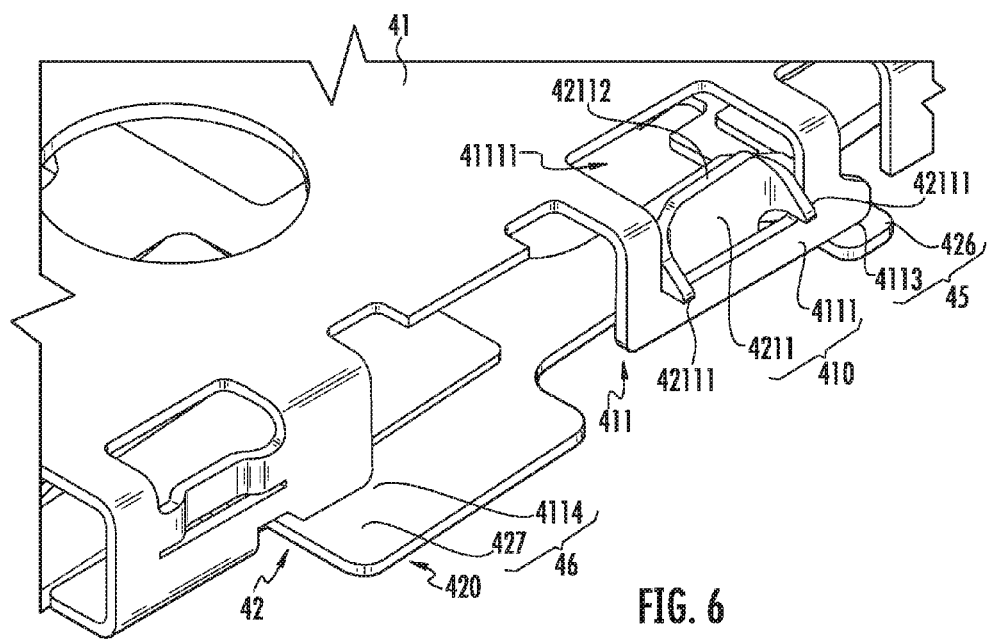
FIG. 6 is a partial enlarged view of a part 9 of FIG. 5.

FIG. 5 is a perspective exploded view of the electrical connector 4 of the embodiment of the present disclosure. FIG. 6 is a partial enlarged view of a part 9 of FIG. 5. Referring to FIG. 3, FIG. 5 and FIG. 6, the latch mechanism 410 may comprise a first latch portion 4211 and a second latch portion 4111. The first latch portion 4211 and the second latch portion 4111 may latched to each other in a clearance fit manner, to allow the cover 41 and the terminal block 42 to movably latch to each other and not easily separated.

The first latch portion 4211 and the second latch portion 4111 are in a clearance fit, to allow that the terminal block 42 which is assembled can still rotate and move relative to the cover 41. In other words, by the clearance fit design, the terminal block 42 can freely rotate and move in a range relative to the cover 41 without interfering. In this way, the terminal block 42 after assembled may be adjusted relative to the cover 41, so as to help ensure the coplanarity of the soldering piece 415 of the cover 41 and the soldering portion 4231 of the terminal 423 of the terminal block 42 when soldered on the circuit board 2. In addition, the clearance fit design can also allow the terminal blocks 42 to latch on the different cover 41 having different heights thereby achieving the effects of sharing the terminal block 42 and reducing the manufacturing cost.

In an embodiment, the first latch portion 4211 may comprise a protruding portion 42111, and the second latch portion 4111 may comprise a latch frame 41111, the protruding portion 42111 extends into the latch frame 41111, to allow that the first latch portion 4211 and the second latch portion 4111 can be latched. In an embodiment, the first latch portion 4211 comprises two protruding portions 42111. In an embodiment, the first latch portion 4211 comprises a body portion 42112 and two protruding portions 42111, the two protruding portions 42111 are respectively positioned in two opposite sides of the body portion 42112. In an embodiment, the protruding portion 42111 of the first latch portion 4211 is a hook matching the latch frame 41111, a top edge of the hook is an oblique edge to facilitate assembling to the latch frame 41111, and a bottom edge of the hook is straight or internal oblique to catch the latch frame 41111.

The cover 41 comprises a top plate 413 and two side edges 411, the two side edges 411 are respectively positioned in opposite sides of the top plate 413, and the slot 43 extends between the two side edges 411. Parts of the each pair of latch mechanisms 410 are respectively provided at the two side edges 411 of the cover 41, and provided at the corresponding positions. In an embodiment, the each side edge 411 is provided with the second latch portion 4111.

The each terminal block 42 comprises two opposite side edges 420. The other parts of the each pair of latch mechanisms 410 are provided at the corresponding side edges 420 of the corresponding terminal block 42. In an embodiment, the each side edge 420 of the each terminal block 42 is provided with the first latch portion 4211 corresponding to the latch mechanism 410.

Referring to FIG. 3 and FIGS. 5-8, the terminal block 42 comprises a first end portion 424 and a second end portion 425 which are opposite. The soldering portion 4231 of the terminal 423 of the terminal block 42 is positioned at the second end portion 42 (as shown in FIG. 3), in this way, a center of gravity of the terminal block 42 is closer to the second end portion 425 between the first end portion 424 and the second end portion 425. And the latch mechanism 410 is positioned between the first end portion 424 and the center of gravity of the terminal block 42 and is closer to the first end portion 424 of the terminal block 42. After the cover 41 and the terminal block 42 are assembled, as the clearance fit is between the first latch portion 4211 and the corresponding second latch portion 4111 and the center of gravity of the terminal block 42 is closer to the second end portion 425, the terminal block 42 can rotate and move (as shown by an arrow 50 in FIG. 7) in such a way that the second end portion 425 is away from the cover 41 at the latch mechanism 410.

Referring to FIG. 3 and FIG. 8, in the each terminal block 42, the latch mechanism 410 is positioned between the first end portion 424 and the second end portion 425. In an embodiment, a distance $L_1$ from the latch mechanism 410 to the first end portion 424 is smaller than a distance $L_2$ from the latch mechanism 410 to the second end portion 425.

Referring to FIGS. 5-7, the electrical connector 4 comprises a first limit mechanism 45, the first limit mechanism 45 corresponds to the terminal block 42. The first limit mechanism 45 is provided between a side edge 411 of the cover 41 and the corresponding side edge 420 of the terminal block 42. The first limit mechanism 45 can limit the terminal block 42 to rotate and move away from each other relative to the cover 41 at the second end portion 425 of the terminal block 42.

Referring to FIG. 6 and FIG. 7, the first limit mechanism 45 may be positioned between the latch mechanism 410 and the first end portion 424 of the corresponding terminal block 42. The first limit mechanism 45 may be provided closer to the first end portion 424 of the terminal block 42. In an embodiment, the first limit mechanism 45 comprises a stopping portion 4113 and a stopping piece 426, and the stopping piece 426 is used for stopping the stopping portion 4113. The stopping portion 4113 may be provided to a side edge 411 of the cover 41, and the stopping piece 426 is provided on the terminal block 42 corresponding to the stopping portion 4113. In an embodiment, the latch mechanism 410 has a side end 4101 toward the corresponding first end portion 424, the stopping portion 4113 is provided at the bottom of the side end 4101. In an embodiment, the stopping portion 4113 extends from the second latch portion 4111.

Referring to FIG. 2, FIG. 3, FIG. 7 and FIG. 8, as the latch mechanism 410 is closer to the first end portion 424 of the terminal block 42 and the center of gravity of the terminal block 42 is closer to the second end portion 425, before the electrical connector 4 is mounted on the circuit board 2, the terminal block 42 will rotate and move (as shown by the arrow 50) to allow the second end portion 425 thereof and the cover 41 away from each other, until the stopping piece 426 of the terminal block 42 contacts the stopping portion 4113. During the process of placing the electrical connector 4 on the circuit board 2, the soldering portion 4231 of the terminal 423 would firstly contact the corresponding soldering pad 22 on the circuit board 2. And then, the soldering portion 4231 of the terminal 423 would continuously contact the corresponding soldering pad 22 on the circuit board 2, until the soldering piece 415 of the cover 41 contacts the corresponding soldering pad 21 on the circuit board 2 (as shown in FIG. 8). In this way, it can be ensured that after the electrical connector 4 is mounted, the soldering portion 4231 of the terminal 423 contacts the corresponding soldering pad 22 on the circuit board 2 and the soldering piece 415 of the cover 41 contacts the corresponding soldering pad 21 on the circuit board 2.

Figure 9:
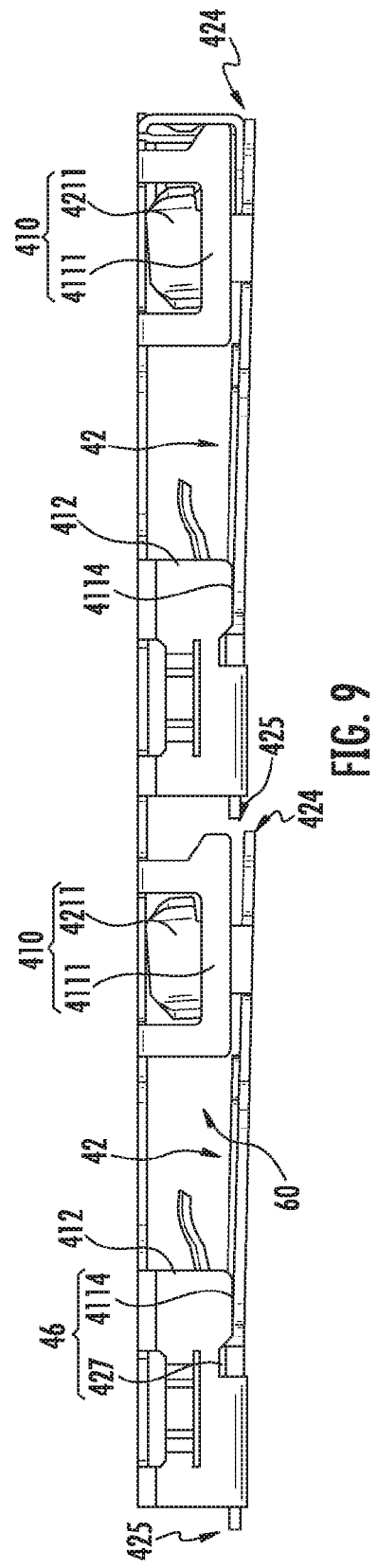
FIG. 9 is a side view of a cross-section of an embodiment of the present disclosure, which illustrates a situation that a stopping portion of a cover stops rotation and movement of the terminal block.

Referring to FIG. 6 and FIG. 9, the electrical connector 4 comprises a second limit mechanism 46 that corresponds to the terminal block 42. The second limit mechanism 46 may be provided between the side edge 411 of the cover 41 and the corresponding side edge 420 of the terminal block 42. The second limit mechanism 46 can limit the at least the terminal block 42 to rotate and move (as shown by an arrow 60) closer to each other relative to the cover 41 at the second end portion 425 of the at least the terminal block 42.

Referring to FIG. 6 and FIG. 9, the second limit mechanism 46 may be positioned between the latch mechanism 410 and the second end portion 425 of the corresponding terminal block 42. The second limit mechanism 46 may be provided closer to the second end portion 425 of the terminal block 42. In an embodiment, the second limit mechanism 46 comprises a stopping portion 4114 and a stopping piece 427 (as shown in FIG. 3 and FIG. 6), the stopping piece 427 is used for stopping the stopping portion 4114. The stopping portion 4114 may be provided to the side edge 411 of the cover 41, and the stopping piece 427 is provided on the terminal block 42 corresponding to the stopping portion 4114. In an embodiment, the cover 41 has a side plate 412 closer to the corresponding second end portion 425, the stopping portion 4114 is provided at the bottom of the side plate 412.

Referring to FIG. 4, the terminal block 42 may comprise an insulative body 421, a metal frame 422 and a plurality of terminals 423. The metal frame 422 may be embedded in and fixed to the insulative body 421. The plurality of terminals 423 are embedded in and fixed to the insulative body 421. The each terminal 423 may further comprise a contact portion 4232, and the contact portion 4232 may extend into the slot 43 (as shown in FIG. 5).

Figure 10:
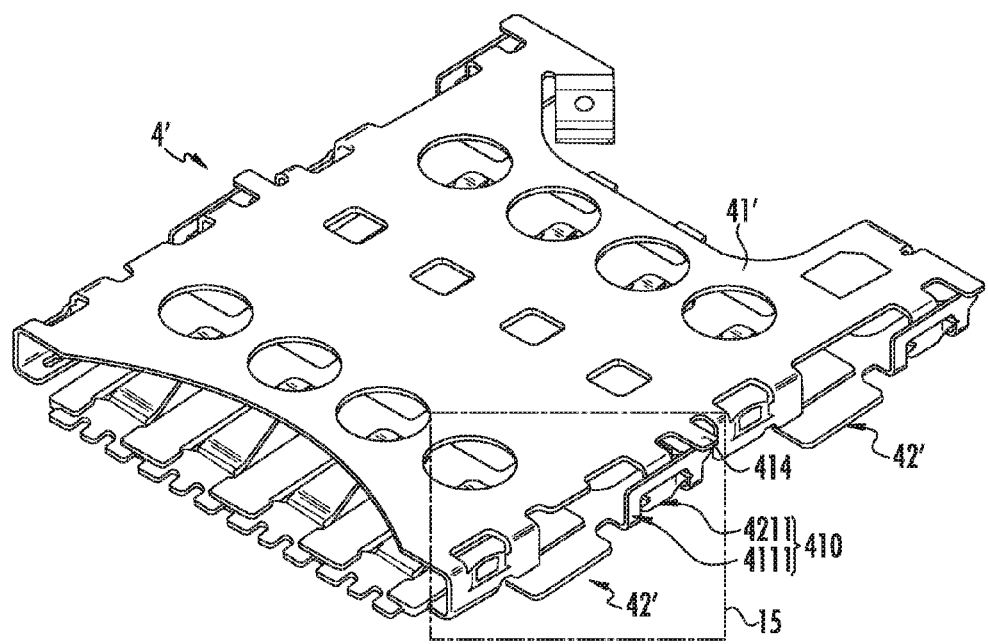
FIG. 10 is a perspective view of an electrical connector of another embodiment of the present disclosure.
Figure 11:
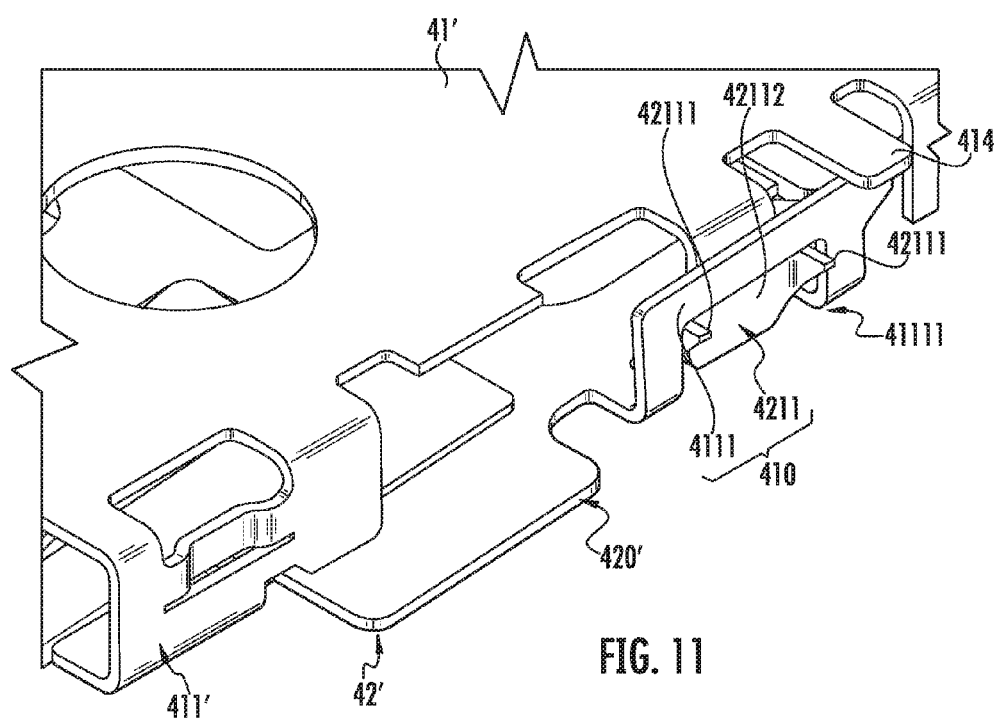
FIG. 11 is a partial enlarged view of the embodiment depicted in FIG. 10.
Figure 12:
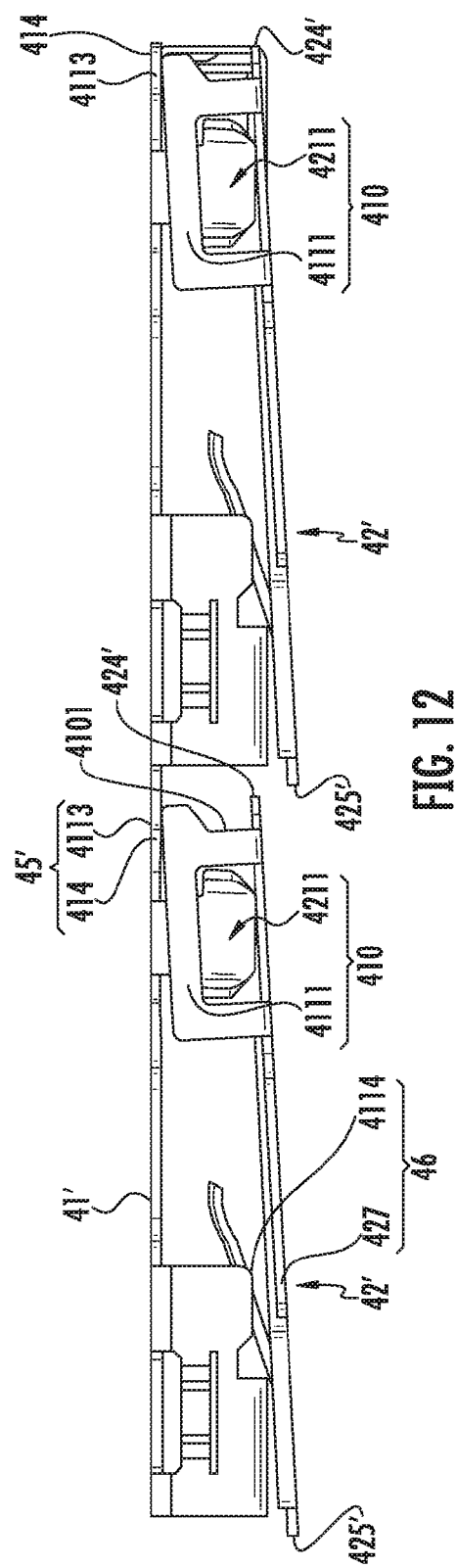
FIG. 12 is a side view of an embodiment that illustrates the state of the terminal block after rotation and movement relative to a latch mechanism of the electrical connector.

FIGS. 10-12 illustrate another embodiment of the present disclosure. FIG. 10 is a perspective exploded view of an electrical connector 4' of another embodiment of the present disclosure. FIG. 11 is a partial enlarged view of a part 15 of FIG. 10. In comparison with FIG. 5 and FIG. 10, the electrical connector 4' of the embodiment of FIG. 10 is similar to the electrical connector 4 of the embodiment of FIG. 5, and a main difference between them is the latch mechanism. Referring to FIG. 10 and FIG. 11, a cover 41' of the electrical connector 4' and each terminal block 42' are latched by a pair of latch mechanisms 410. The each side edge 411' of the cover 41' of the electrical connector 4' is provided with a first latch portion 4211 of the latch mechanism 410. The each side edge 420' of the each terminal block 42' is provided with a second latch portion 4111 of the latch mechanism 410. After the terminal block 42' is assembled to the cover 41', the latch mechanism 410 allows the terminal block 42' to rotate and move relative to the cover 41'.

As shown in FIG. 12, the electrical connector 4' comprises a first limit mechanism 45', the first limit mechanism 45' corresponds to the terminal block 42'. The first limit mechanism 45' is provided between the side edge 411' of the cover 41' and the corresponding side edge 420' of the terminal block 42'. The first limit mechanism 45' can limit the terminal block 42' to rotate and move away from each other relative to the cover 41' at the second end portion 425' of the terminal block 42'.

Referring to FIG. 11 and FIG. 12, the first limit mechanism 45' is positioned between the latch mechanism 410 and the first end portion 424' of the corresponding terminal block 42'. The first limit mechanism 45' may be provided closer to the first end portion 424' of the terminal block 42'. In an embodiment, the first limit mechanism 45' comprises a stopping portion 4113 and a stopping piece 414, and the stopping piece 414 is used for stopping the stopping portion 4113. The stopping portion 4113 may be provided to the side edge 420' of the corresponding terminal block 42', and the stopping piece 414 is provided to the corresponding side edge 411' of the cover 41' corresponding to the stopping portion 4113. In an embodiment, the latch mechanism 410 has a side end 4101 toward the corresponding first end portion 424', the stopping portion 4113 may be provided on the side end 4101, a clearance fit between the first latch portion 4211 and the corresponding second latch portion 4111 can allow the terminal block 42' to rotate and move relative to cover 41' at the latch mechanism 410, and the stopping portion 4113 may stop the stopping piece 414, to limit the cover 41' and the terminal block 42' to rotate and move away from each other at the second end portion 425'. In an embodiment, the stopping portion 4113 extends from the second latch portion 4111.

Referring to FIG. 11, the first latch portion 4211 comprises a protruding portion 42111, the second latch portion 4111 comprises a latch frame 41111, the protruding portion 42111 extends into the latch frame 41111, to allow the first latch portion 4211 and the second latch portion 4111 to be latched. In an embodiment, the first latch portion 4211 comprises two protruding portions 42111. In an embodiment, the first latch portion 4211 comprises a body portion 42112 and two protruding portions 42111, the two protruding portions 42111 are respectively positioned in two opposite sides of the body portion 42112. In an embodiment, the protruding portion 42111 of the first latch portion 4211 is a hook matching the latch frame 41111.

Figure 13:
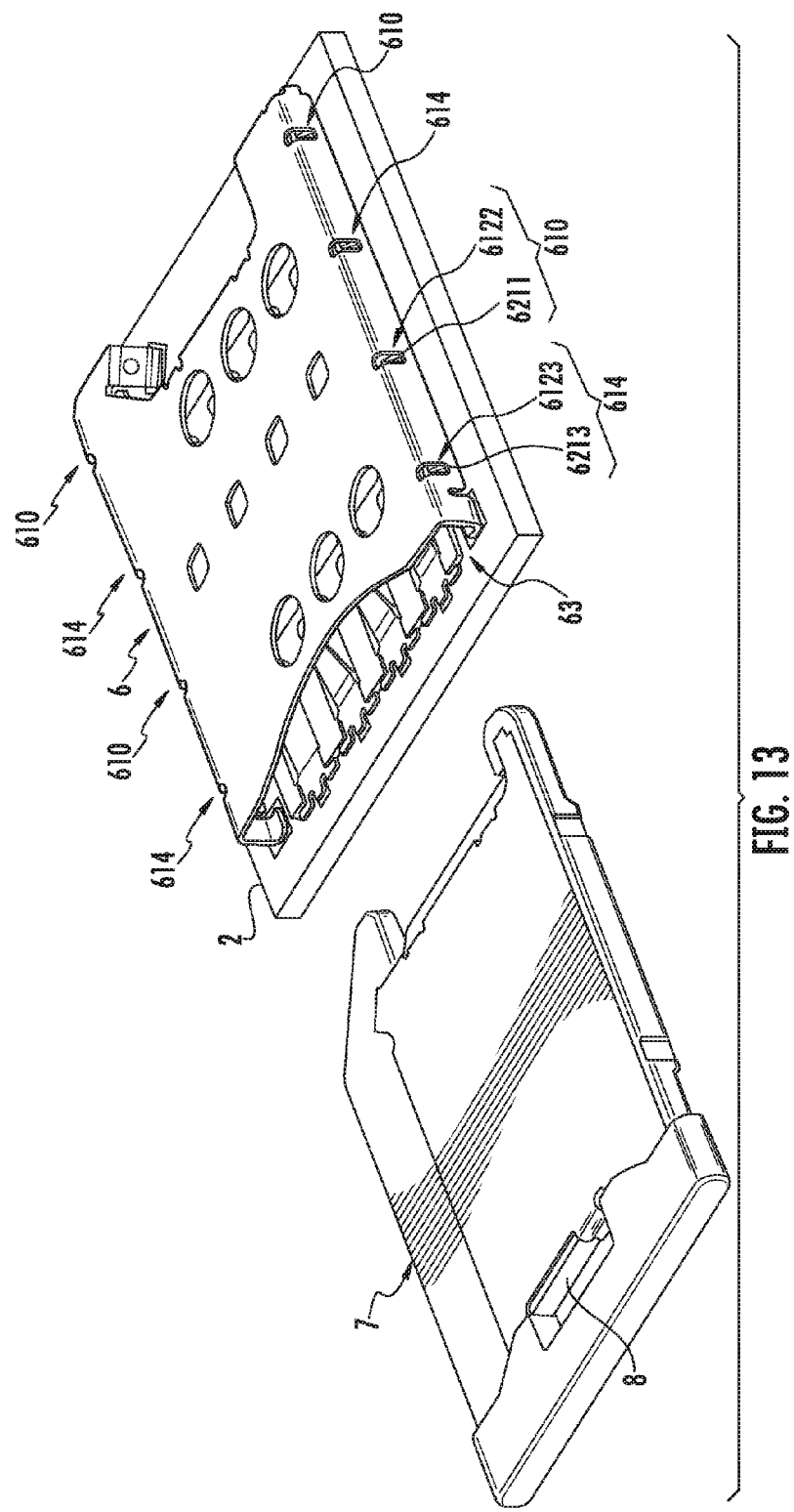
FIG. 13 is a perspective exploded view of another embodiment of the present disclosure, which illustrates a circuit board, an electrical connector, a tray and an electronic card.

FIGS. 13-17 illustrate another embodiment of the present disclosure. FIG. 13 is a perspective exploded view of another embodiment of the present disclosure, which illustrates a circuit board 2, an electrical connector 6, a tray 7 and an electronic card 8. As shown in FIG. 13, the electronic card 8 may be mounted on the tray 7. The electrical connector 6 may be mounted on the circuit board 2, and may receive the tray 7.

The electrical connector 6 comprises a cover 61, a terminal block 62 and a pair of latch mechanisms 610, the pair of latch mechanisms 610 is respectively provided between two side edges 619 of the cover 61 and two side edges 620 of the terminal block 62. The terminal block 42 is loosely latched to the cover 61 by use of the pair of latch mechanisms 610. The cover 61 and the terminal block 62 together may define a slot 63, and the tray 7 may be inserted into the slot 63. In an embodiment, both the cover 61 and the terminal block 62 may be soldered on the circuit board 2.

In an embodiment, the electrical connector 6 comprises a plurality of terminal blocks 62 and the corresponding pairs of latch mechanisms 610, the plurality of terminal blocks 62 are arranged along a mating direction of the tray 7, the each terminal block 62 is latched to the cover 61 by the corresponding one pair of latch mechanisms 610.

The terminal block 62 comprises a first end portion 625, a second end portion 626, two side plates 621 and a plurality of terminals 624. The each terminal 624 comprises a soldering portion 6241. The soldering portion 6241 of the terminal 624 is arranged at the second end portion 626 of the terminal block 62. The two side plates 621 are respectively positioned in two side edges 620 of the terminal block 62. The cover 61 comprises a top plate 611 and two side plates 612, and the two side plates 612 are connected to the top plate 611.

In an embodiment, the one pair of latch mechanisms 610 is respectively provided between two side plates 612 of the cover 61 and the two side plates 621 of the terminal block 62.

The first end portion 625 and the second end portion 626 of the terminal block 62 are opposite, the center of gravity of the terminal block 62 is closer to second end portion 626. The latch mechanism 610 is positioned between the first end portion 625 and the second end portion 626 of the corresponding terminal block 62, and a distance from the latch mechanism 610 to the first end portion 625 is smaller than a distance from the latch mechanism 610 to the second end portion 626.

Figure 15:
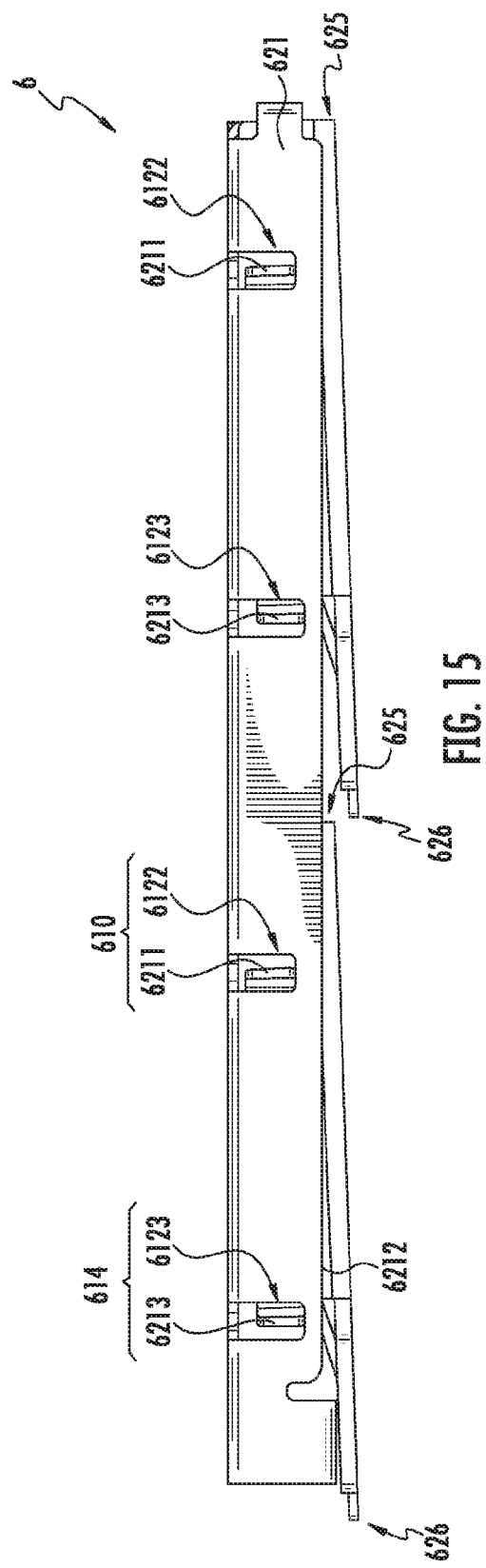
FIG. 15 is a side view of a cross-section of an embodiment of an electrical connector which illustrates that the terminal block is at a stopping position after rotation and movement relative to the cover.

FIG. 15 is a side diagram view of the embodiment of the present disclosure, which illustrates that the terminal block 62 is at a stopping position after rotation and movement relative to the cover 61. Referring to FIG. 15, the latch mechanism 610 may comprise a first latch portion 6211 and a second latch portion 6122. The first latch portion 6211 and the second latch portion 6122 of the latch mechanism 610 are latched to each other and in the clearance fit, as the latch mechanism 610 is closer to the first end portion 625 of the terminal block 62, and the center of gravity of the terminal block 62 is positioned between the latch mechanism 610 and the second end portion 626 of the terminal block 62, the terminal block 62 after assembled may rotate and move relative to the cover 61 at the latch mechanism 610, in this way, the coplanarity of soldering portions 613 of the cover 61 and the soldering portions 6241 of the terminals 624 on the circuit board 2 can be aided. In addition, by the clearance fit design, the terminal block 62 may be latched on the different cover 61 having different heights. In an embodiment, the first latch portion 6211 of the latch mechanism 610 comprises a protruding portion, and the second latch portion 6122 of the latch mechanism 610 comprises a latch frame, the protruding portion may extend into the latch frame, so as to latch to each other in the clearance fit manner. In an embodiment, the first latch portion 6211 is a hook matching the latch frame, the top edge of the hook is an oblique edge to facilitate assembling to the latch frame, and the bottom edge of the hook is straight or internal oblique to catch the latch frame. In an embodiment, the latch frame is positioned on the side plate 612 of the cover 61, and the protruding portion is positioned on the corresponding side plate 621 of the terminal block 62.

Figure 14:
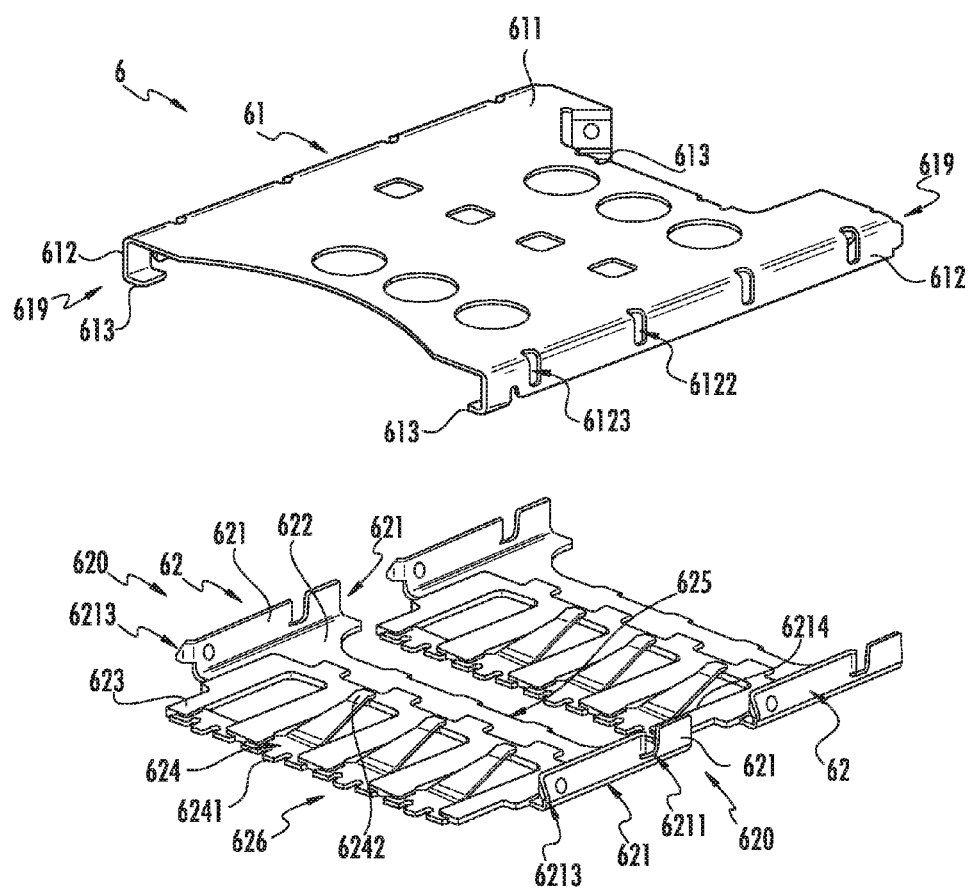
FIG. 14 is a perspective exploded view of an embodiment of an electrical connector which illustrates a terminal block and a cover.

Referring to FIGS. 13-15, the electrical connector 6 may comprise a first limit mechanism 614, the first limit mechanism 614 corresponds to the terminal block 62. The first limit mechanism 614 is provided between a side edge 619 of the cover 61 and the corresponding side edge 620 of the terminal block 62, to limit the terminal block 62 to rotate and move away from each other relative to the cover 61.

Referring to FIG. 15, the first limit mechanism 614 is positioned between the latch mechanism 610 and the second end portion 626 of the corresponding terminal block 62. The first limit mechanism 614 may be provided closer to the second end portion 626 of the terminal block 62. In an embodiment, the first limit mechanism 614 comprises a protruding portion 6213 and a latch frame 6123, and the protruding portion 6213 extends into the latch frame 6123 to latch to each other in the clearance fit manner. When the terminal block 62 rotate and moves to a position relative to the cover 61, the protruding portion 6213 may stop the latch frame 6123, so as to limit the terminal block 62 to rotate and move relative to the cover 61.

In an embodiment, the latch mechanism 610 comprises a protruding portion and a latch frame, and the first limit mechanism 614 comprises a protruding portion 6213 and a latch frame 6123, the latch frame 6123 of the first limit mechanism 614 extends closer to the bottom edge 6212 of the side plate 621. In this way, when the electrical connector 6 is suspended, the terminal block 62 can rotate and move in such a way that the second end portion 626 is away from the cover 61 at the latch mechanism 610, and the protruding portion 6213 of the first limit mechanism 614 closer to the second end portion 626 of the terminal block 62 moves down along with rotation and movement of the terminal block 62, until the protruding portion 6213 stops the latch frame 6123.

In an embodiment, a first latch portion 6211 and a protruding portion 6213 are formed on the each side plate 621 of the terminal block 62, and a second latch portion 6122 and a latch frame 6123 are correspondingly formed on the corresponding side plate 612 of the cover 61. In another modified embodiment, a second latch portion 6122 and a latch frame 6123 are formed on the each side plate 621 of the terminal block 62, and a first latch portion 6211 and a protruding portion 6213 are correspondingly formed on the corresponding side plate 612 of the cover 61.

Referring to FIG. 14 and FIG. 15, an end portion 6214 of the side plate 621 of the terminal block 62 may be closer to the first end portion 625 of the terminal block 62, and a top edge of the side plate 621 of the terminal block 62 is also closer to the top plate 611 of the cover 61, in this way, the end portion 6214 of the side plate 621 of the terminal block 62 may also stop on the top plate 611 of the cover 61, so as to limit the terminal block 62 to rotate and move relative to the cover 61.

In an embodiment, the terminal block 62 further comprises a metal frame 622 and an insulative body 623, and the metal frame 622 may be embedded in and fixed to the insulative body 623. The plurality of terminals 624 may be embedded in and fixed to the insulative body 623.

The each terminal 624 further comprises a contact portion 6242, after the terminal block 62 is assembled, the contact portion 6242 may be positioned in the slot 63.

Figure 16:
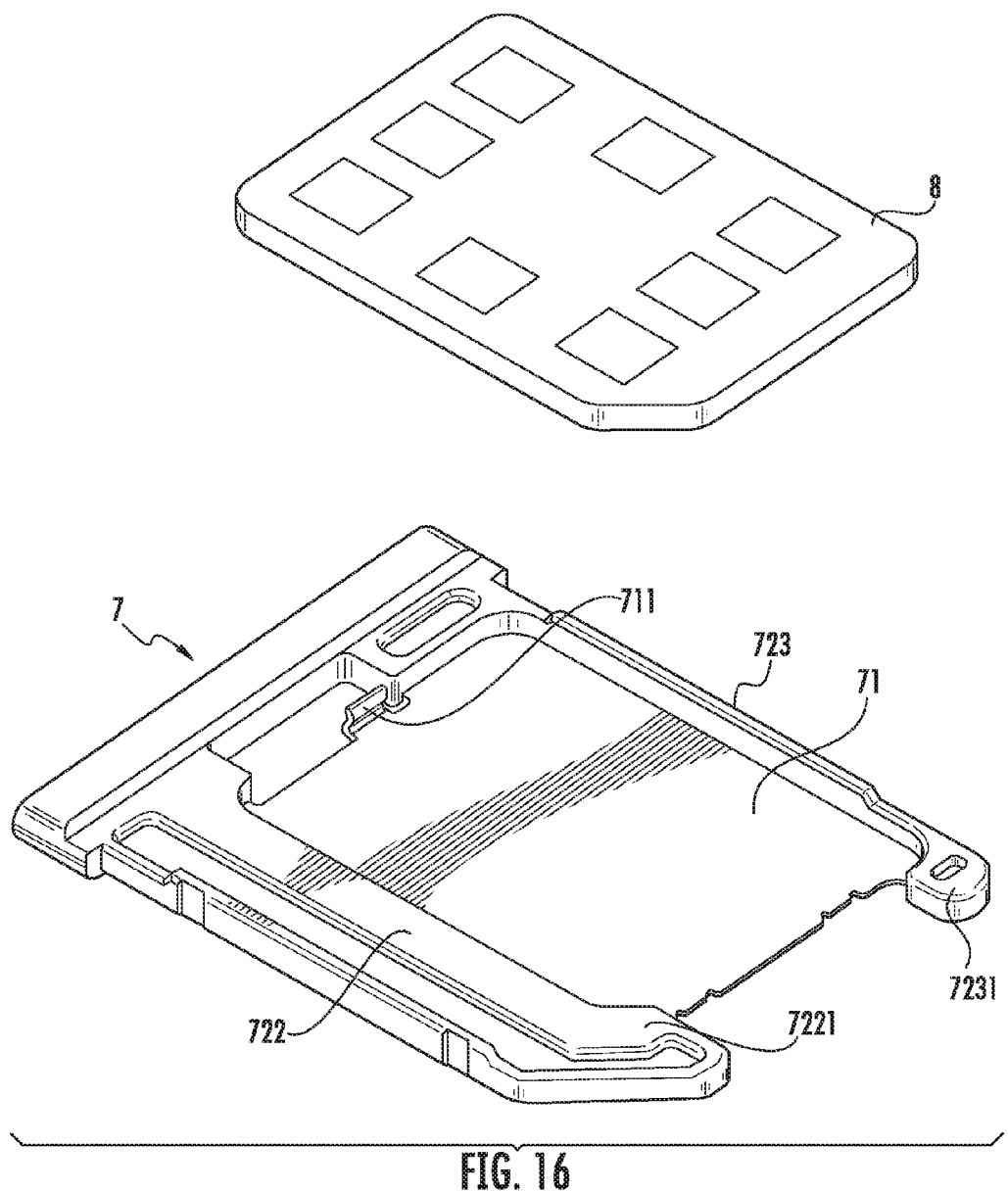
FIG. 16 is an exploded perspective view of a tray and the electronic card.
Figure 17:
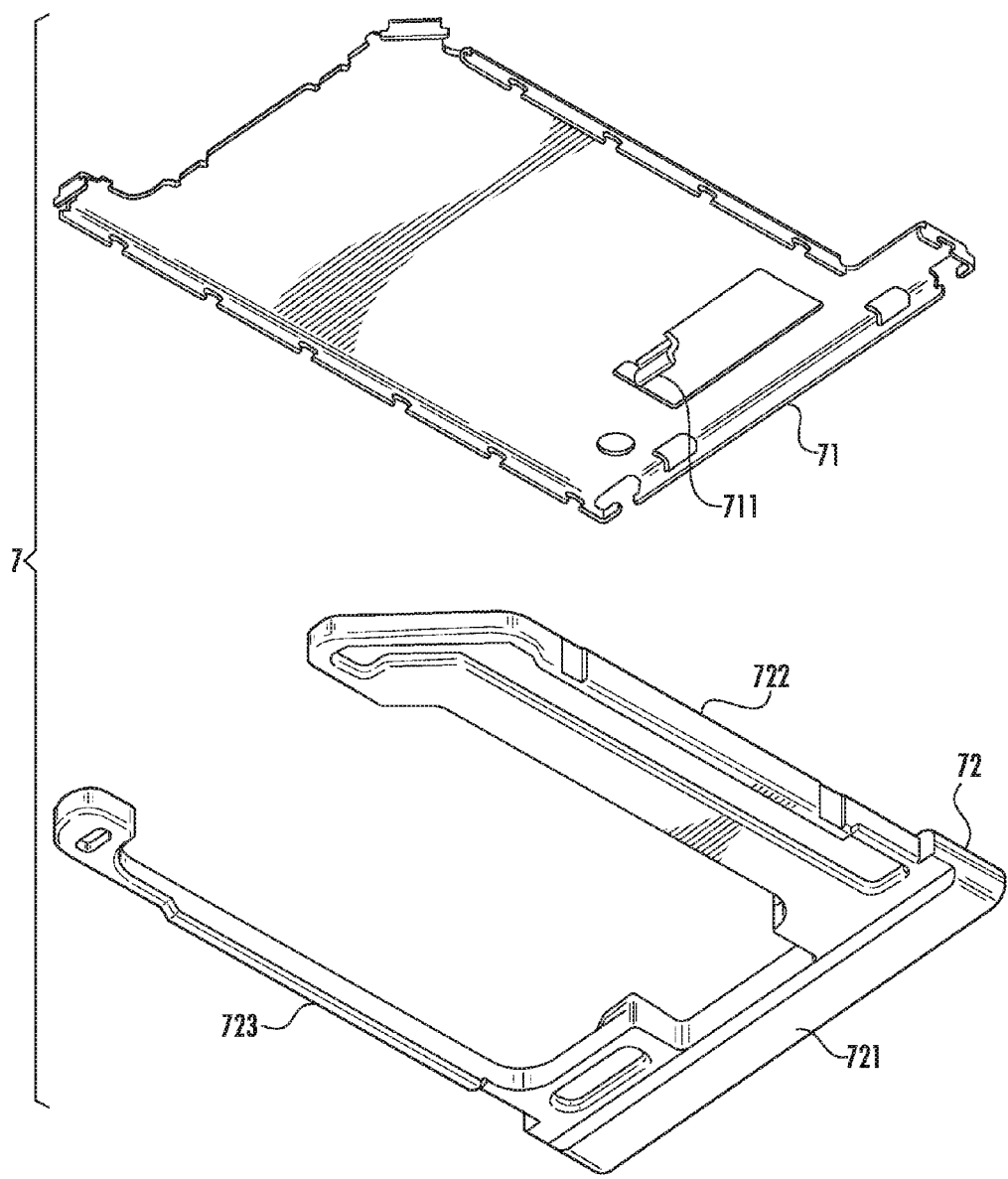
FIG. 17 is an exploded perspective view of an embodiment of a bottom member and a frame member of the tray.

FIG. 16 is an exploded view of an embodiment of the present disclosure, which illustrates the tray 7 and the electronic card 8. FIG. 17 is a exploded view of an embodiment of the present disclosure, which illustrates a bottom member 71 and a frame member 72 of the tray 7. Referring to FIG. 16 and FIG. 17, the tray 7 is used for loading the electronic card 8. The tray 7 may comprise a bottom member 71 and a frame member 72. In an embodiment, the bottom member 71 contains metal, the frame member 72 contains plastic, the frame member 72 can be produced by injection molding and fixedly connected to the bottom member 71 during manufacturing.

The frame member 72 may comprise a body portion 721 and two side arm portions 722, 723. A user can push or pull the body portion 721 to insert the tray 7 into or remove from the electrical connector 6. The two side arm portions 722, 723 extend from the same side of the body portion 721, and are respectively closer to two opposite sides of the body portion 721 to define a receiving space for the electronic card 8. The bottom member 71 extends below the receiving space. Tip ends of the two side arm portions 722, 723 slightly extend oppositely to form hook portions 7221, 7231. The bottom member 71 comprises a latch piece 711, the latch piece 711 and the hook portions 7221, 7231 are oppositely provided, the latch piece 711 and the hook portions 7221, 7231 together may cooperate to fix the electronic card 8 on the tray 7.

An embodiment of the present disclosure discloses an electrical connector. The electrical connector comprises a terminal block and a cover. The terminal block and the cover are latched to each other in a clearance fit manner to allow the terminal block to connect to the cover and rotate and move relative to the cover. By the clearance fit design, soldering portion of terminals of the terminal block and soldering pieces of the cover can adjust relative positions in multiple directions respectively or to each other, so as to ensure that both the soldering portions of the terminals and the soldering pieces of the cover can contact the corresponding soldering pads on the circuit board and are reliably and suitably soldered on the circuit board. In addition, the clearance fit design can allow the same terminal block to latch on the different covers having different heights to achieve results of sharing the terminal block and reducing the manufacturing cost.

Technical contents and technical features of the present disclosure are disclosed as above, but person skilled in the art still can make various substitutions and modifications without departing from the spirit of the present disclosure based on the teaching and disclosure of the present disclosure. Therefore, the protection scope of the present disclosure should not be limited to the contents disclosed by the embodiments, but should include various substitutions and modifications without departing the present disclosure, and is covered by the following Claims of the present disclosure.

What is claimed is:

1. An electrical connector, comprising:
 a cover comprising a top plate and two side edges connected to the top plate;
 a terminal block having two opposite side edges, the terminal block and cover together defining a slot; and
 a pair of latch mechanisms respectively provided between the two side edges of the cover and the two side edges of the terminal block, each latch mechanism comprising a first latch portion and a second latch portion, wherein the first latch portion and the second latch portion are latched to each other and in a clearance fit, wherein the terminal block is configured to rotate and move relative to the cover at the pair of latch mechanisms when the first and second latch portions are latched together.

2. The electrical connector according to claim 1, wherein the terminal block comprises a first end portion and a second end portion which are opposite, and a center of gravity of the terminal block is closer to the second end portion, and the latch mechanism is positioned between the first end portion and the center of gravity.

3. The electrical connector according to claim 2, wherein the terminal block comprises an insulative body; a metal frame embedded in and fixed to the insulative body;
 and a plurality of terminals embedded in and fixed to the insulative body and arranged in a row, each of the terminal comprising a contact portion and a soldering portion, the contact portion extending into the slot, the soldering portion being positioned at the second end portion.

4. The electrical connector according to claim 2, wherein the first latch portion comprises protruding portion, the second latch portion comprises a latch frame and the protruding portion extends into the latch frame.

5. The electrical connector according to claim 4, wherein the first latch portion comprises a body portion and two protruding portions and the two protruding portions are hooks positioned in the two opposite sides of the body portion.

6. The electrical connector according to claim 2, wherein the cover comprises two side plates, and the terminal block comprises two side plates, the pair of latch mechanisms is respectively provided between the two side plates of the cover and the two side plates of the terminal block.

7. The electrical connector according to claim 6, wherein the first latch portion comprises a protruding portion, the second latch portion comprises a latch frame, the protruding portion extends into the latch frame, the latch frame is provided on the corresponding side plate of the cover, the protruding portion is provided on the corresponding side plate of the terminal block and the protruding portion extends into the latch frame.

8. The electrical connector according to claim 6, further comprising a second end portion, the first limit mechanism being provided between one of the side plates of the cover and one of the side plates of the terminal block and configured to limit rotation of the terminal block.

9. The electrical connector according to claim 8, wherein the first limit mechanism comprises a latch frame and a protruding portion extending into the latch frame, the protruding portion is positioned on one of the side plates of the terminal block and the latch frame is positioned on one of the side plates of the cover.

10. The electrical connector according to claim 2, wherein the latch mechanism is positioned between the first end portion and the second end portion, and a distance from the latch mechanism to the first end portion is smaller than a distance from the latch mechanism to the second end portion.

11. The electrical connector according to claim 10, further comprising a first limit mechanism, the first limit mechanism being provided between one of the side edges of the cover and one of the side edges of the terminal block, so as to limit the terminal block to rotate and move away from each other relative to the cover at the second end portion.

12. The electrical connector according to claim 11, wherein the first limit mechanism comprises a stopping portion and a stopping piece for stopping the stopping portion, the stopping portion is provided on one side of one of the latch mechanisms toward the first end portion, and the stopping piece is provided on the terminal block.

13. The electrical connector according to claim 11, wherein the first limit mechanism comprises a stopping portion and a stopping piece for stopping the stopping portion, the stopping portion is provided on one side of one of the latch mechanisms toward the first end portion, and the stopping piece is provided to the cover.

14. The electrical connector according to claim 11, wherein the cover comprises two side plates, and the terminal block comprises two side plates, the first limit mechanism is provided between one of the side plates of the cover and one of the side plates of the terminal block, the first limit mechanism comprises a latch frame and a protruding portion extending into the latch frame, the protruding portion is positioned on one of the side plates of the terminal block and the latch frame is positioned on one of the side plates of the cover.

15. The electrical connector according to claim 11, further comprising a second limit mechanism, the second limit mechanism being provided between one of the side edges of the cover and one of the side edges of the terminal block and configured to limit rotation of the terminal block.

16. The electrical connector according to claim 15, wherein the second limit mechanism is positioned between the latch mechanism and the second end portion of the terminal block, and comprises a stopping portion and a stopping piece for stopping the stopping portion, the stopping portion is provided to the cover and the stopping piece is provided on the terminal block.

\* \* \* \* \*